(12) United States Patent
Hermary et al.

(10) Patent No.: US 12,455,763 B2
(45) Date of Patent: Oct. 28, 2025

(54) ADAPTIVE AND PROGRAMMABLE SYSTEM ARCHITECTURE FOR DISTRIBUTED PARALLEL COMMAND TIMING, EXECUTION, CONTROL AND ROUTING

(71) Applicant: Hermary Opto Electronics Inc., Coquitlam (CA)

(72) Inventors: Terrance J. Hermary, Coquitlam (CA); Alexander T. Hermary, Belcarra (CA); Mohammad Reza Sahraei, North Vancouver (CA); Joshua Schley Harrington, Coquitlam (CA)

(73) Assignee: Hermary Opto Electronics Inc., Coquitlam (CA)

( * ) Notice: Subject to any disclaimer, the term of this patent is extended or adjusted under 35 U.S.C. 154(b) by 603 days.

(21) Appl. No.: 17/642,857

(22) PCT Filed: Aug. 29, 2020

(86) PCT No.: PCT/CA2020/051186
§ 371 (c)(1),
(2) Date: Mar. 14, 2022

(87) PCT Pub. No.: WO2021/051187
PCT Pub. Date: Mar. 25, 2021

(65) Prior Publication Data
US 2022/0382258 A1    Dec. 1, 2022

(30) Foreign Application Priority Data

Sep. 16, 2019  (CA) .................................. CA 3055507

(51) Int. Cl.
*G06F 9/48* (2006.01)
*G05B 19/042* (2006.01)

(52) U.S. Cl.
CPC ....... *G06F 9/4881* (2013.01); *G05B 19/0426* (2013.01)

(58) Field of Classification Search
CPC .............. G06F 9/4881; G05B 19/0426; G05B 19/41845; G05B 19/418
See application file for complete search history.

(56) References Cited

U.S. PATENT DOCUMENTS

| | | | |
|---|---|---|---|
| 8,918,647 B1 * | 12/2014 | Wallrabenstein | H04L 63/061 713/172 |
| 2003/0141093 A1 * | 7/2003 | Tirosh | H04L 45/00 174/72 A |
| 2008/0056307 A1 * | 3/2008 | DeCusatis | H04L 69/28 370/503 |
| 2013/0219355 A1 * | 8/2013 | Brown | G06F 8/71 717/106 |

(Continued)

Primary Examiner — Javier O Guzman
(74) Attorney, Agent, or Firm — Michael D. Eisenberg; MDE Patents (57) ABSTRACT

This invention relates to adaptive hardware control systems and provides a system architecture for designing different sequences of events for doing various tasks, comprising a plurality of devices, a plurality of modules related to the devices, a plurality of Module Command Timing and Execution Engines for synchronization and control of a plurality of time-controlled and time-identified events among the devices and the modules that result in a selected, defined sequence of events.

20 Claims, 6 Drawing Sheets

(56) References Cited

U.S. PATENT DOCUMENTS

| | | | |
|---|---|---|---|
| 2013/0265933 A1* | 10/2013 | Powell, III | H04W 56/0015 370/315 |
| 2014/0114461 A1* | 4/2014 | Hermary | G05B 19/4097 700/163 |
| 2015/0039121 A1* | 2/2015 | Hermary | G05B 19/4097 700/163 |
| 2016/0006526 A1* | 1/2016 | Cho | H04J 3/0667 370/503 |
| 2017/0277671 A1* | 9/2017 | Duggan | G06F 40/171 |
| 2018/0310133 A1* | 10/2018 | Ramasamy | G01S 19/48 |
| 2019/0097745 A1* | 3/2019 | Mallela | H04J 3/0667 |

\* cited by examiner

ADAPTIVE AND PROGRAMMABLE SYSTEM ARCHITECTURE FOR DISTRIBUTED PARALLEL COMMAND TIMING, EXECUTION, CONTROL AND ROUTING

FIELD OF THE INVENTION

This invention relates to the general field of adaptive hardware control systems, and more specifically to networked system architecture for using multiple modules to accomplish various tasks.

BACKGROUND OF THE INVENTION

In many industrial processes, a variety of devices are used to accomplish a result. In a typical factory system, for example, an assembly line uses a conveyor to bring unfinished products past a number of stations that detect, alter, or package the products. Once such a system is set up, it can be very expensive and time-consuming to reconfigure the devices or the sub-tasks that each device performs.

There is a need for a robust and adaptive system of distributed devices that can be configured and controlled at the local level and in which the changing needs of a system can be met with a simple method for reconfiguration of all devices within the system. For example, it would be an advantage on an assembly line to be able to easily change, update, remove or add a task for a robot or machine to execute, based on system input that may be provided by a user or a sensor device.

Another example would be in the field of machine vision. The number of illuminator, detector and other components in existing machine vision systems makes them costly and difficult to coordinate and configure. Prior art machine vision systems have had limited centralized control over peripherals in the scanning environment and use components that are hard-wired or hard-coded. A technician knowledgeable with the individual components has been needed to make changes in the type, arrangement or configuration of the components. Moreover, in prior art scanning systems, the solutions provided to prevent crosstalk between devices, made the setup and configuration of these devices very rigid and not easily adaptable to additional tasks.

There is a need for a system architecture that enables the design and implementation of varied and distinct sequences of events for doing various tasks by a multiplicity of devices, in which the system allows for easy device configuration and reconfiguration, a method for concurrent and synchronized execution of tasks among devices and a structure that defines how data from a device will be forwarded on to subsequent processing tasks.

SUMMARY OF THE INVENTION

This invention provides a system architecture for designing different sequences of events for doing various tasks, comprising a plurality of devices, a plurality of modules related to the devices, a plurality of Module Command Timing and Execution Engines (MCTEE) for synchronization and control of a plurality of time-controlled and time-identified events among the devices and the modules that result in a selected scenario. In this Specification and in the following Claims "scenario" or "scenarios" means a defined sequence of events.

A Composer (CPSR) is a software application that generates system operational parameters and commands in a standardized format to be forwarded to each device and subsequently each module. Each device includes one or more modules which directly control various device functions. The standardized format is thus used for configuring of the devices and modules and for performing event execution by the devices and modules, and for implementing distribution rules for modules that generate output data.

The invention also provides a system architecture for specifying the distribution of data, comprising a plurality of devices, a plurality of modules related to the devices and a plurality of module data tagging and routing engines for the synchronization, identification, labeling and directing of data within the system. A data packager identifies, assembles, and distributes data detected from a series of events in a selected scenario. A synchronized clock providing Time of Day (ToD) distribution to a plurality of devices and a plurality of modules related to the devices provides a link between ToD fields with a correct ToD execution time for a plurality of actions.

The invention may also be characterized as a method of designing different scenarios for doing various tasks, comprising a plurality of devices, a plurality of modules related to the devices, and a plurality of module command timing and execution engines that synchronize and control a plurality of time-controlled and time-identified events among the devices and the modules that results in a selected scenario.

In a preferred embodiment, a general command time schedule developed by the CPSR is transmitted to and consumed concurrently by the devices and modules to result in a plurality of time-controlled and time-identified events among the devices and the modules that are sequenced to produce a series of scene events in accordance with a selected scenario. The execution of commands is provided by the MCTEE, which includes a method for dispatching commands at specified times, a method for taking a standardized command and decoding it to a module's specific needs and a method for passing on a decoded command to the module. Each of a series of scene events typically sensed by at least one module and a corresponding series of scene data is output by a detector type module within a device. A set of data for a scene event is given an identifier based on the scene event, and the identifier comprises a data header from among, but not limited to, the following: a time of the scene event, a device identifier for a device that detects the scene event, a module identifier for a module that detects the scene event, specifics of a module command, specifics of a scene, a module state, feedback from prior events, a state of other devices, and a state of other modules. The time of an event is tracked, controlled and identified in fine increments, to the nanosecond or finer, as may be required, and is specified and formatted as a Time of Day (ToD) as determined by the synchronized clock. A data header is used to send a set of data on zero, one, or more processing stream path(s) that is configurable within the system architecture.

A key advantage of this novel control system architecture is the synchronized module command timing and execution engines that are distributed and known throughout the system. Multiple devices and modules can be mixed and matched dynamically to make whatever kind of configuration is needed, a complex functionality that is not present in the prior art. The number of combinations and permutations that the new system can provide is in no way limited by the architecture. The architecture's distributed control system allows for the utilization of existing and new devices efficiently providing a flexible, robust, and resilient system.

Optional features of the system include some or all of the following:
 a) an external signal source is detected by an input module and used to specify when a specific scenario across a plurality of devices and modules is executed;
 b) a timing schedule for a scenario is distributed to a plurality of the devices and modules that are selected during configuration to be active in the system architecture for a task;
 c) each module makes itself available for a configuration task and provides the configuration task with its capabilities;
 d) a configuration task initiates a discovery phase to determine what devices and modules exist within the system and are qualified for configuration;
 e) permissions are granted by a device to a configuration task for that device and modules related to that device to be configurable;
 f) an authentication protocol is used to verify the validity of a device within the system;
 g) a multiplicity of the devices and modules are decentralized, and a synchronization method is used to provide each device and module with a common Time of Day;
 h) detector type module output can be selected for use to reconfigure or switch configuration states of the system resulting in output from a plurality of modules for a modified task;
 I) a module contains a module specification file which uploads its data to the CPSR;
 j) permissions are defined that specify the CPSR's access to a module;
 k) an authentication protocol is used by the CPSR to verify the validity of a module;
 l) data headers are built from information contained in a command time schedule (CTS) provided at configuration, and appended to respective raw detector data from a detector type module by that module's data packager, which appends the data headers at appropriate times according to the ToD fields in the CTS and the current ToD provided by the synchronized clock;
 m) a combined stream of data that includes the raw detector data and the data header is forwarded to a data router, which uses the logic provided at configuration in the form of a data router configuration file to select zero, one, or more downstream paths to forward the data to, based on the information contained within the data header;

A plurality of devices typically includes one or more detector modules, which will capture data from the environment, and typically includes one or more emitter modules which will interact with the environment.

For example, in such a system adapted for machine vision, the detector module could be a camera, and the emitter module could be an illumination source, and there could be a plurality of such modules within the distributed system. The system architecture provides ease of deterministic sequencing of hardware events, which is critical for machine vision applications. Clock synchronization allows precise time-based command execution, which provides high quality machine vision data, while allowing for much higher adaptability to real life changes in the scanning environment. The ability to adjust the sequence of events to image various objects for a range of tasks, allows the system to be very flexible in configuration, capture and distribution of machine vision data. The invention's architecture is also applicable for motion control tasks. A plurality of actuator modules can readily implement motion tasks at specific times and under specific conditions, and motion detector modules can sense the resulting motion at specified times. The architecture for configuration, execution and data distribution provides a control system that can orchestrate the operation of numerous devices in a deterministic manner. Moreover, this architecture enables the system to adapt to changing operational conditions as needed. The architecture does not limit the number of devices within the system.

DETAILED DESCRIPTION

Figure 1:
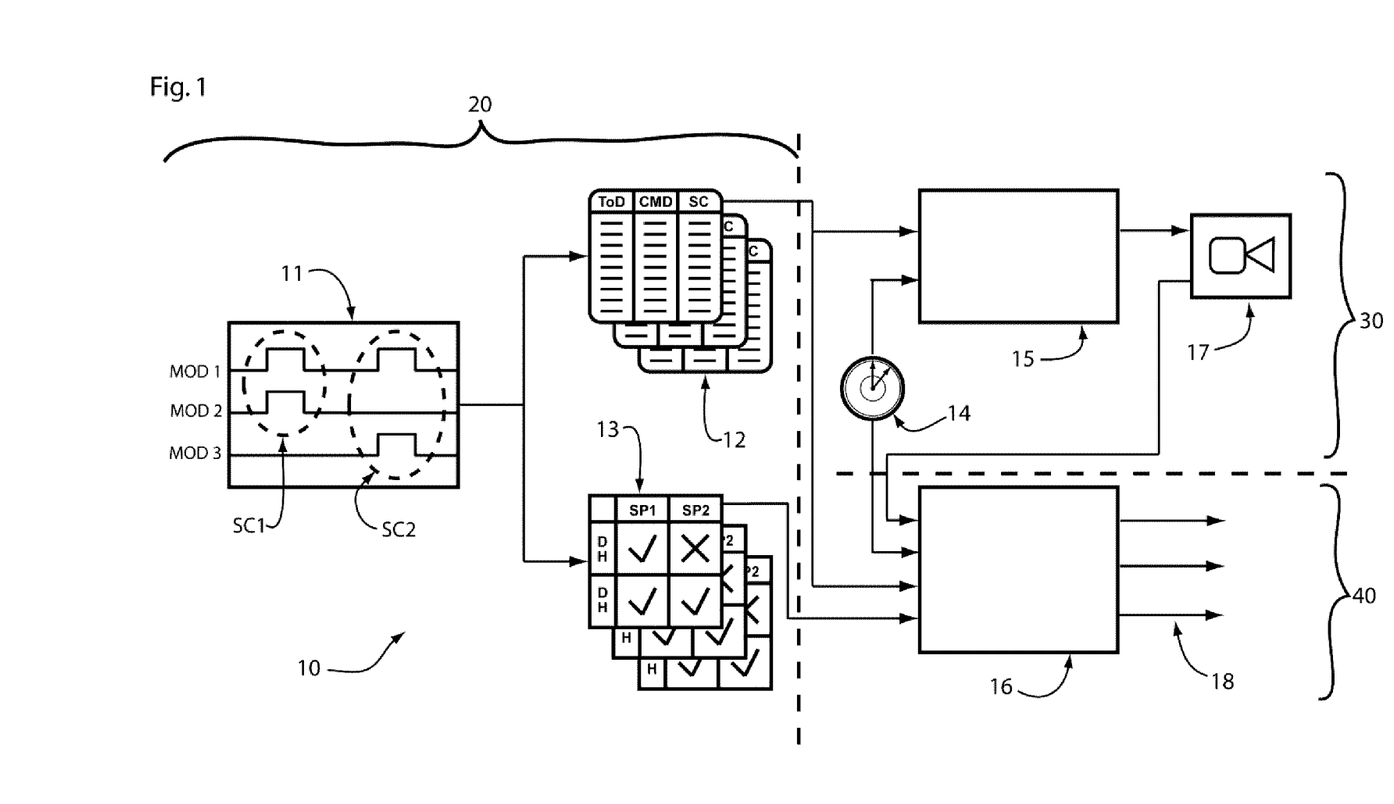
FIG. 1 is a block diagram the basic elements and main functional groupings of the adaptable System 10 for the Configuration 20, Execution 30 and Distribution 40 of a module.

Referring to FIG. 1, the system architecture provides for the Configuration, Execution and Distribution of a module. The module is the base component in the hierarchy of system elements. The instantiation of one or more modules as illustrated in FIG. 1 within one or more devices would comprise a complete system. A system can be minimal with just one module in one device or much larger comprising a plurality of modules within a plurality of devices (the number is not limited by the system architecture).

A. Configuration

The setup of the system 10, is performed hierarchically from a module (MOD) 17 at the lowest level through to the device and finally to the highest level (the system). Just one MOD 17 of the system 10 is illustrated in FIG. 1 for simplicity. The system 10 would advantageously comprise multiple different modules. Two main elements are defined during Configuration 20: the scenarios and interactions between MOD 17, other modules and the environment; and the logic pertaining to the routing of detector output data. The Configuration 20 at the base level need not necessarily be done from a physically centralized location, but in general the Configuration 20 will be done in a centralized manner in that the process is performed with system-wide knowledge via the Module Specification Files (MSF) 21 (see FIG. 2 and section N. below).

The system-wide Configuration 20 is done in a standardized manner, where the complexities associated with each individual MOD 17 are taken care of within the Module Command Timing and Execution Engine (MCTEE) 15 (see section K below) at Execution 30 time. The Configuration 20 step is not limited to taking place once but can be actively updated and changed both by users of the system 10 as well as by feedback from parts of the system 10 itself. This combines to make the system 10 flexible and adaptable to a wide range of tasks.

The output product of the Configuration 20 phase is the Command Time Schedule (CTS) 12 and the Data Router Configuration File (DRC) 13.

The Configuration 20 is carried out within a system 10 component called the composer (CPSR) 11.

B. Execution

Execution 30 occurs within each specific Module Command Timing and Execution Engine (MCTEE) 15 when each command's execution time matches the time of the synchronized clock, the command is decoded for the MOD 17 specific hardware, and passed to the MOD 17.

Each individual MOD 17 within the system 10 will each have its own Command Time Schedule 12 and will execute independently of all other modules. This creates a very decentralized control architecture where one system 10 component will not easily take down the whole system 10.

Critical to the entire system 10 operating as designed is that each MOD 17 shares a synchronized clock with all the other modules in the system 10. There are various published ways a synchronized clock can be implemented, such as IEEE 1588 which details the precision time protocol method where a common clock is created via a synchronization method amongst an ethernet network of devices.

C. Distribution

The Distribution 40 phase deals with the routing of output data from the Execution 30 phase. Each MOD 17 (detector type) will have one or more streams of Raw Detector Data output and it is important that this data reach the appropriate next downstream process.

This is accomplished by the Module Data Tagging and Routing Engine (MDTR) 16 (see section L below) using the Command Time Schedule to tag a Raw Detector Data 35 associated with a specific command with both temporal (Time of Day (ToD)) and spatial (Scene (SC)) information.

This information is packaged as the Data Header (DH) 45 and will continue along with the Raw Detector Data 35 to form the Tagged Data package 42.

When the Tagged Data arrives at the Data Router (DR) 44 it is then forwarded on to the output Stream Paths (SP) 18 via logic provided to the Data Router (DR) 44 from the DRC 13. The routing logic specified in the Configuration 20 stage, can be easily reconfigured at will, even during system 10 operation. The SP(s) 18 feed to Application (APP) 60 specific processing downstream.

E. Time of Day (ToD) and Synchronized Clock

The ToD 14 is the time as provided by the synchronized clock. Depending on the application the resolution of the Time of Day may be very high (on the order of nanoseconds or even pico-seconds). For an application with more than one device, it is advantageous that the modules belonging to each device share a common clock, which is synchronous with other devices' clocks. At the device level this can be done internally with discrete signals. At the system 10 level this can be done with various synchronization methods such as IEEE 1588. The ToD 14 derived from the synchronized clock is what allows for each instantiation of the Module Command Timing and Execution Engine (MCTEE) 15 to independently control each MOD 17 without the need for a centralized master controller.

F. Composer (CPSR)

Figure 2:
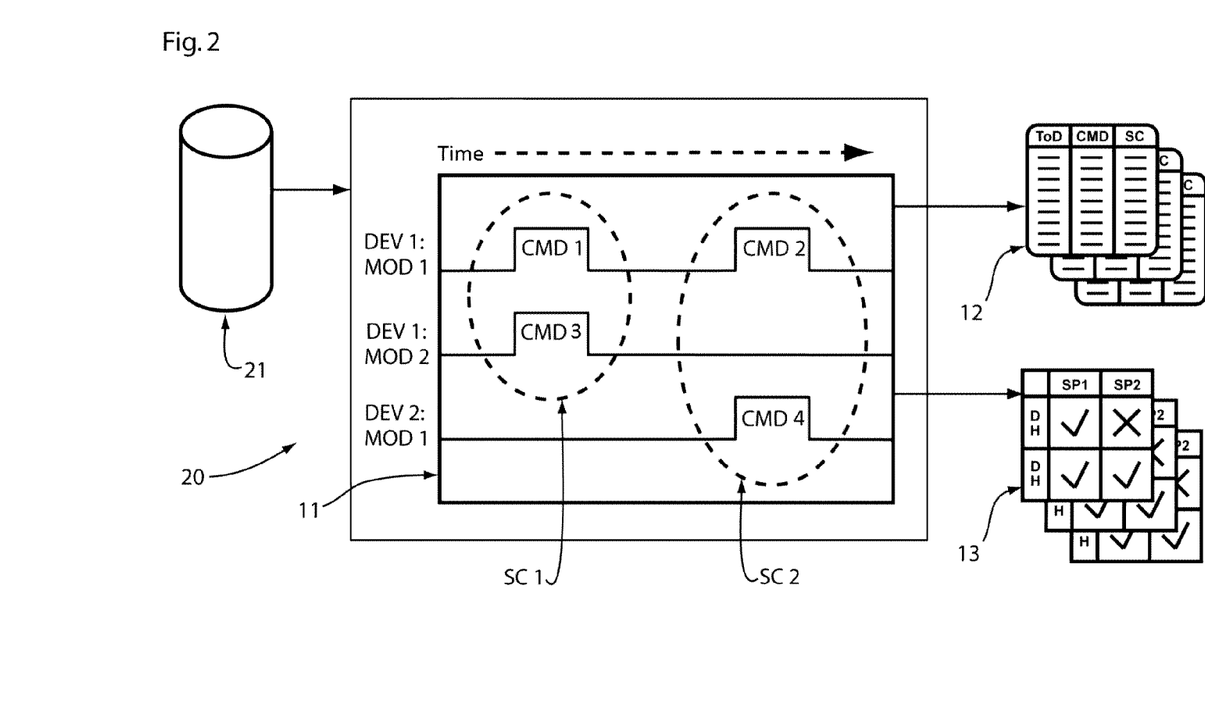
FIG. 2 is a block diagram illustrating the elements and arrangement for Configuration 20 of the system.

The CPSR 11 is the application that sets up the control and data routing of each MOD 17. This is where the files (CTS 12 & DRC 13) that control a MOD 17 are established and edited. The set-up within the CPSR 11 may take place offline at initial setup but may also be available at runtime to continually update the Configuration 20 of all modules. FIG. 2 shows an example where the CPSR 11 can be set up to create SC 1 in FIG. 2 by having the CTS 12 issue CMD 1 and CMD 3 to MOD 1 and MOD 2 of DEV 1 respectively, simultaneously followed by SC 2 in FIG. 2 occurring by the CTS 12 issuing CMD 2 and CMD 4 to MOD 1 of DEV 1 and to MOD 1 of DEV 2 respectively. The DRC 13 is created in the composer by defining logical relationships between data header fields and stream paths 18. This could be as simple as a truth table or could consist of more complex logical conditions. The CPSR's output is the CTS 12 and the DRC 13 which together as output products perform the implementation of the scenario (SC 1 followed by SC 2) selected by the CPSR 11. A Module Specification File 21 (see Section N. below) provides the capabilities of a MOD 17 to the CPSR.

G. Scene (SC)

A scene (SC) defines and identifies the spatial output of a given MOD 17 that is a detector type module. This is based on the command specifics of the detector type module output as well as the state of the Environment (ENV) 62 at the time of Execution 30. The state of the Environment 62 is determined by what combination of emitter type modules 17 are interacting with the Environment (ENV) and what the command state of those emitter type modules are at the time of Execution 30 to result in the SC.

H. Command Time Schedule (CTS)

The Command Time Schedule (CTS) 12 is an output file generated by the CPSR 11 during the Configuration 20 process. Each MOD 17 within a system 10 will receive is own CTS 12. The CTS 12 details all the Commands (CMD) and Scene (SC) descriptors along with the Time of Day 14 from the synchronized clock that the Commands (CMD) execution is to take place. The CTS 12 can be setup to repeat cyclically, based on some internal or external asynchronous signal or can be a continually running list that is adaptively updated by system 10 requirements and feedback.

I. Data Router Configuration (DRC)

The DRC 13 is a file that details the logic for steering the Raw Detector Data 35 tagged with a Data Header (DH) 45 to specific Stream Paths (SP) 18. Specifically, this is where the logic that lays down what fields within Data Header will dictate how Tagged Data 42 is routed to different Stream Paths (SP) 18. The contained logic is defined at the Configuration 20 phase within the CPSR 11. The DRC 13 can be continually updated by system 10 requirements and feedback.

J. Module (MOD)

A MOD 17 is a component of the system 10 that will interact with the Environment (ENV) 62 as either an emitter or a detector. Modules such as MOD 17 receive commands from the Module Command Timing Execution Engine (MCTEE) 15 dictating how and when to execute. An emitter type MOD 17 typically will emit some form of energy that will interact with the ENV 62. Examples of emitter type modules are: lasers, light emitting diodes (LEDs), actuators, or signal output interfaces. A detector type MOD 17 typically will receive some form of energy from the ENV 62. This will often be in conjunction with the output of one or more emitter modules creating Scenes (SC). Examples of detector type modules are: image sensors, accelerometers, encoders, temperature sensors, microphones, flow meters, or signal input interfaces.

K. Module Command Timing and Execution Engine (MCTEE)

The MCTEE 15 is responsible providing a MOD 17 with the correct Commands (CMD) at specific times as defined in the CPSR 11. The MCTEE 15 takes the CTS 12 and a synchronized clock as input and by comparing the current synchronized clock time to the ToD 14 field in the CTS 12 it delivers the correct Command (CMD) to the MOD 17 at the specified time. As each MOD 17 has its own instantiation of a MCTEE 15 specific to its requirements it is the level at which the common syntax that is provided to all modules by the CPSR 11 is decoded for each MOD 17. The MCTEE 15 is an essential piece of the system 10 architecture required to reduce the complexity and streamline the Configuration 20 of the overall system 10. This is especially apparent when dealing with many different MOD 17 types that can be deployed in many different potential Applications (APP) 60.

L. Module Data Tagging and Routing Engine (MDTR)

Module Data Tagging and Routing Engine (MDTR) 16 is responsible for tagging the Raw Detector Data 35 output with Data Header (DH) 45 information and routing it to the correct downstream Stream Path(s) (SP) 18 using instructions provided in the DRC 13 file. The inputs to the MDTR 16 are: Raw Detector Data 35 to be tagged and steered; the Time of Day 14 from the synchronized clock; the CTS 12 with command, time and scene information; the DRC 13 containing routing logic and other system level data that may be provided by application specific downstream processes. The outputs of the MDTR 16 are one or more Stream Paths (SP) 18 with the Tagged Data 42 moving along them. The Stream Paths 18 will carry the Tagged Data 42 to the required processing task(s).

M. Stream Path (SP)

A Stream Path (SP) 18 is a path that carries Tagged Data 42 to a processing task. Tagged Data may be routed to none, one or more Stream Paths (SP) 18.

N. Module Specification File (MSF)

Referring now to FIG. 2, in Configuration 20, a Module Specification File (MSF) 21 is a file associated with a single MOD 17 that details the capabilities, limitations, permissions, availability, and specifics of that MOD 17. The MSF 21 is provided to the CPSR 11 to provide the available Commands (CMD) and to ensure that the Configuration 20 files used to control each MOD 17 do not attempt to tell the MCTEE 15 to execute an invalid series of Commands (CMD).

O. Command Dispatcher (CD)

Figure 3:
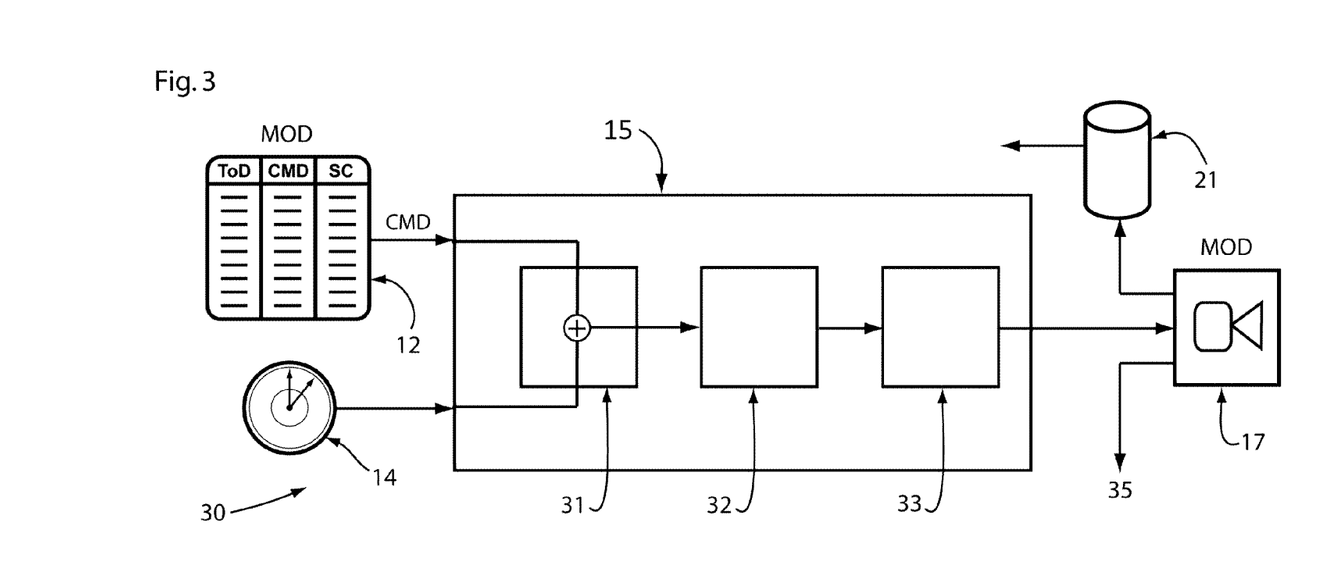
FIG. 3 is a block diagram illustrating the elements and arrangement for Execution 30 by the system.

Referring now to FIG. 3, in Execution 30, the Command Dispatcher (CD) 31 is a unit within the MCTEE 15 that takes the CTS 12 and ToD 14 from the synchronized clock as input and passes on Commands within the CTS 12 to the Command Decoder (CDE) 32 at the specified ToD 14.

P. Command Decoder (CDE)

The Command Decoder (CDE) 32 is a unit within the MCTEE 15 that takes a Command (CMD) as specified in the CTS 12 and decodes it to the format necessary for a specific MOD 17. This component is what allows for a common Configuration 20 file be applicable to many different MOD 17 types with varying capabilities and interfaces.

Q. Command Execution Unit (CEU)

The Command Execution Unit (CEU) 33 is a unit within the MCTEE 15 that interfaces with the associated MOD 17 and executes the command in the specific control pattern for the MOD 17 to change its state. The CEU 33 provides the physical interface between a MOD 17 and its associated MCTEE 15.

R. Raw Detector Data

Raw Detector Data 35 is the raw data that is output from a detector MOD 17 as a result of a Command (CMD), for Distribution 40 to downstream processing paths.

S. Data Header (DH)

Figure 4:
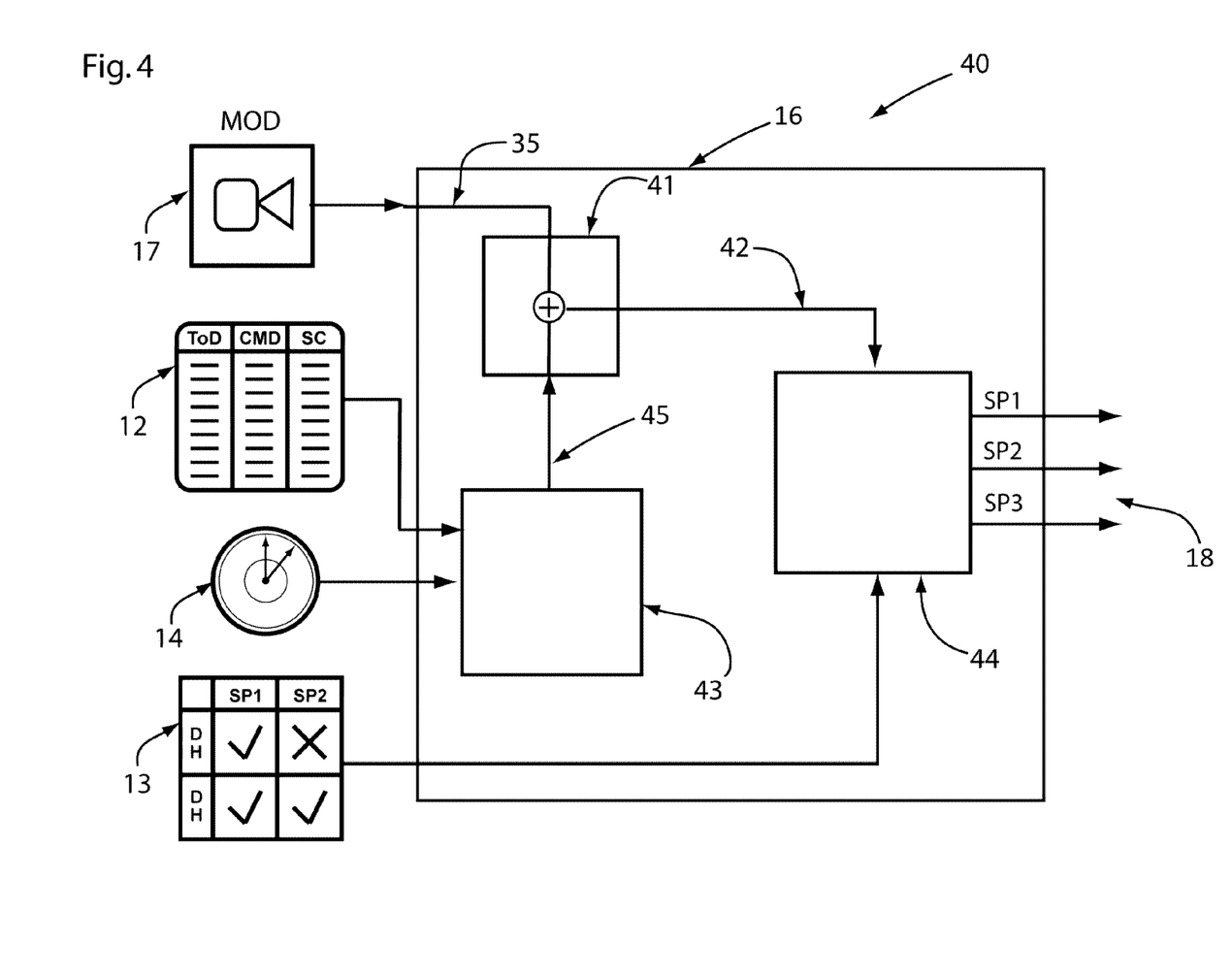
FIG. 4 is a block diagram illustrating the elements and arrangement for data Distribution 40 by the system.

Referring now to FIG. 4, the Distribution 40 of data resulting from operation of the system architecture is shown. The Data Header (DH) 45 contains identifying information that can be attached to Raw Detector Data 35 from a MOD 17. This may include but is not limited to: the Time of Day, the Scene, command details, output information from other modules, and output information from downstream processing tasks.

T. Data Packager (DP)

The Data Packager (DP) 41 is a unit within the MDTR 16 that combines Raw Detector Data 35 with the appropriate DH 45. This is accomplished using the known ToD 14 for both the DH 45 and the Raw Detector Data 35.

U. Data Header Builder (DHB)

The Data Header Builder (DHB) 43 is a unit within the MDTR 16 that creates the DH 45 associated with Raw Detector Data 35 output from a detector type MOD 17. The DHB 43 takes information from the ToD 14 synchronized clock, the CTS 12 (and potentially other inputs) and formats them into a header that can be attached to Raw Detector Data 35, from which the DP 41 forms a Tagged Data 42 package.

V. Data Router (DR)

The Data Router (DR) 44 is a unit within the MDTR 16 that steers Tagged Data 42 to none, one or more Stream Paths (SP), e.g. SP 1, SP 2, SP 3 shown in FIG. 4, as is defined by the DRC 13.

W. Tagged Data

Tagged Data 42 is a package of data containing the Raw Detector Data 35 output from a detector type MOD 17 and a Data Header (DH).

X. Device (DEV)

Figure 5:
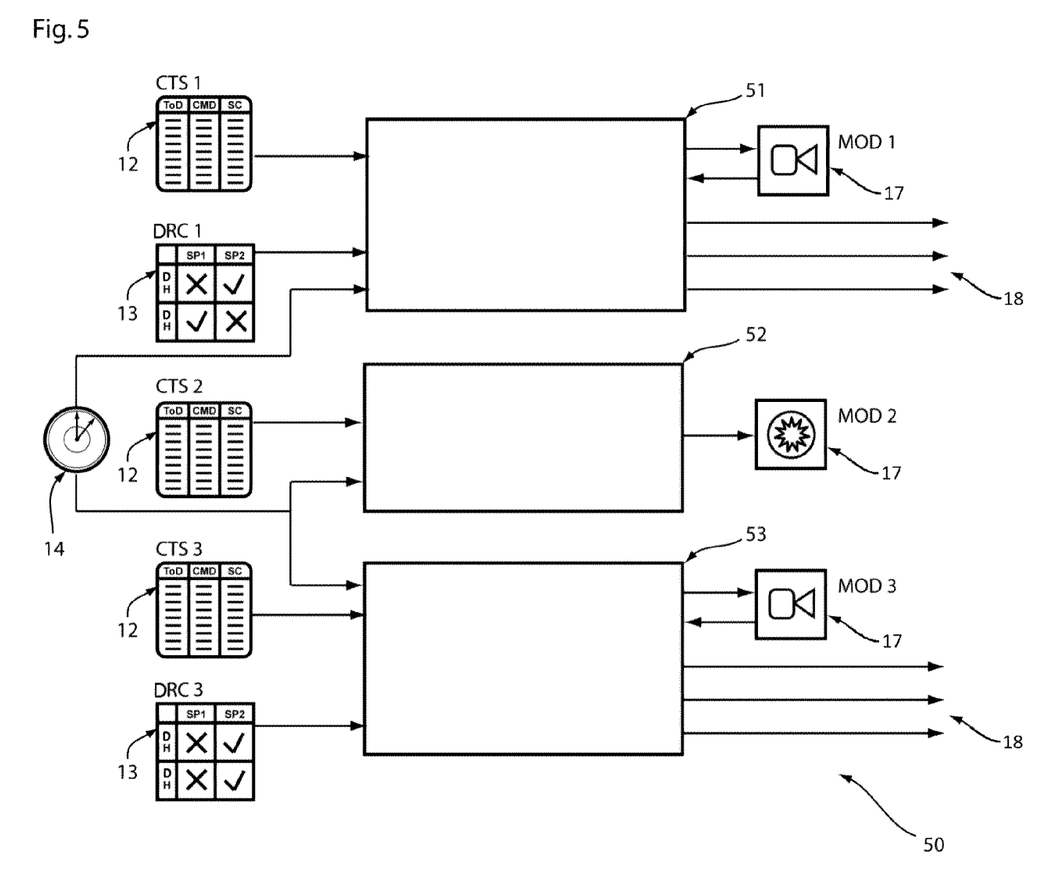
FIG. 5 is a block diagram illustrating the elements from the prior figures as present and arranged at the Device 50 level.

Referring now to FIG. 5, a Device (DEV) 50 is shown with its functional components. A DEV 50 is a system 10 component that contains one or more Modules 17. Typically, a DEV 50 will have a physical housing and provide a standardized method for interfacing the internal modules with those contained in other DEVs 50, such as those that may exist and co-operate together on an Ethernet Network. A DEV 50 provides an environment for its modules to be operational and communicative within a distributed architecture. Also, a DEV 50 supplies a ToD 14 synchronized clock for its modules, and if required, for other devices in a heterogeneous network. In the FIG. 5 example of a DEV 50, there are three CTS 12 (CTS 1, CTS 2, and CTS 3) and two DRCs (DRC 1 and DRC 3) that provide respective input to the three MCTEE 15 and two MDTR 16 into 51, 52 and 53 (Note that an emitter type module does note require a MDTR instantiation) that control the DEV 50's three MODs (MOD 1, a detector module showing a camera icon), MOD 2, an emitter module showing an illuminator icon, and MOD 3, another detector module). In DEV 50, each of MOD 1 and MOD 3, as detector modules, have output stream paths 18 for down stream processing's.

Y. System

Figure 6:
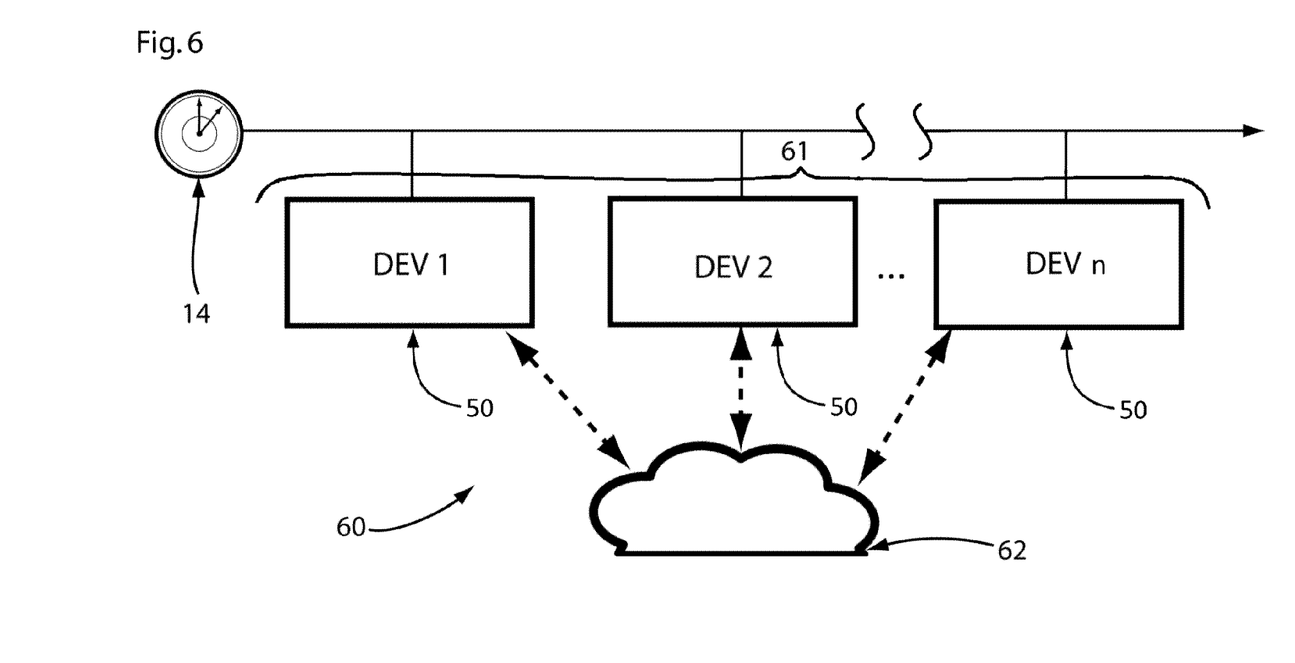
FIG. 6 is a block diagram illustrating the elements and arrangement that extend the device to the application 60 for the System 10.

Referring now to FIG. 6, a system 10 is typically comprised of a physical group 61 of DEVs, each DEV having at least one MOD 17 (in many situations a DEV has multiple modules each differing in their respective functionality), and a communication infrastructure. A system 10 is the assembly of the required physical resources needed to implement an Application 60. Within the architecture's component hierarchy, the system 10 is at the top. The system architecture is the structure of the system 10. The system architecture of this invention is adept at handling many devices and many modules, as well as changes to those components, and at managing a multitude of different scenarios.

Z. Application (APP)

An Application (APP) 60 is the Configuration 20, Execution 30, Distribution 40 and processing of data within a system 10. The Environment (ENV) 62 is the physical setting in which an APP is deployed. Typically, an APP 60 is designed to interact with the ENV 62 to accomplish a specific task. The CPSR 11 is used to configure all modules within the system 10 for the task required. An example of an Application 60 is using a camera (a detector type MOD 17) and a laser (an emitter type MOD 17) working together to gather 3D measurements of an object presented in the ENV 62.

AA. Other Embodiments and Uses

Other embodiments are not ruled out or similar methods leading to the same result. The architecture herein provided could be used in and benefit many industries: factory automation and robotic assembly; object recognition, self-driving cars and trucks; the movie and television industry for the positions and characteristics of lights, cameras, actors and props, any situation in which one wishes to control light sources depending on what is revealed by the light or captured by cameras, whether X-ray, ultraviolet, infrared or visible light; theatre setup including the control of sound sources and resulting sound; or multi-spectral imaging.

The foregoing description of the preferred apparatus and method of installation and implementation should be considered as illustrative only, and not limiting, Various changes and modifications will occur to those skilled in the art, without departing from the true scope of the invention as defined in the above disclosure, and the following general claims.

The invention claimed is:

1. A system architecture for designing and effecting different scenarios for doing various tasks, comprising:
   a) a plurality of devices that include one or more modules each of which controls various functions related to the devices;
   b) a plurality of module command timing and execution engines for control of a plurality of time-controlled and time-identified events among the devices and the modules that result in a selected scenario;
   in which a general command time schedule developed by a composer software application generates system operational parameters and commands in a standardized format to be forwarded to each device and subsequently each module, using a plurality of module specification files related to modules and devices processing capabilities, in which the standardized format is used for configuring of the devices and modules and for performing event execution by the devices and modules.

2. A system architecture for specifying the distribution of data, comprising a plurality of devices, a plurality of modules related to the devices and a plurality of module data tagging and routing engines for the synchronization, identification, labeling and directing of data within the system, in which a composer software application module generates system operational parameters and commands in a standardized format to be forwarded to each device and subsequently each module, in which the standardized format is used for configuring of the devices and modules and for performing sequential event execution by the devices and modules, and for implementing distribution rules for modules that generate output data.

3. A system architecture for designing and effecting different scenarios for doing various tasks, comprising:
   a) a plurality of devices;
   b) a plurality of modules related to the devices;
   c) a plurality of module specification files related to modules and devices processing capabilities; and
   d) a plurality of module command timing and execution engines that control a plurality of time-controlled and time-identified events among the devices that are sequenced to produce a series of scene events in accordance with a selected scenario.

4. The system architecture of claim 1, in which: a synchronized clock distributed to a plurality of devices and a plurality of modules related to the devices provides a link between Time of Day fields in a command time schedule with a correct Time of Day execution time for a plurality of actions.

5. The system architecture of claim 1, in which:
   a) a plurality of time-controlled and time-identified events among the devices and the modules are sequenced to produce a series of scene events in accordance with a selected scenario;
   b) each of a series of scene events is sensed by at least one module and a corresponding series of scene data is output by the module;
   c) a set of data for a scene event is given an identifier based on the scene event.

6. The system architecture of claim 5, in which:
   a) the identifier comprises a data header from among the following: a Time of Day time of the scene event, a device identifier for a device that detects the scene event, a module identifier for a module that detects the scene event, specifics of a module command, specifics of a scene, a module state, feedback from prior events, a state of other devices, a state of other modules;
   b) the data header is used to send a set of data on zero, one, or more processing stream paths that are configurable;
   c) data headers are built from information contained in a Command Time Schedule provided at configuration, and appended to respective raw detector data from a detector type Module by the module's Data Packager, which appends the data headers at appropriate times according to the Time of Day fields in the Command Time Schedule and the current Time of Day provided by the synchronized clock;
   d) a combined stream of data that included the raw detector data and the data header is forward to a data router, which uses logic provided at configuration in the form of a data router configuration file to select zero, one or more downstream paths to forward the data to, based on the information contained within the data header.

7. The system architecture of claim 1, in which:
   a) at least one module timing control and execution engine includes a method for dispatching commands at specified times, a method for taking standardized command and decoding it to a module's specific needs and a method for passing on a decoded command to the module;
   b) a plurality of detector type modules provide feedback for command reconfiguration;
   c) an external signal is detected by an input module and used to specify when a specific scenario across a plurality of devices and modules is executed;
   d) a timing schedule for a scenario is distributed to a plurality of the devices and modules that are selected during configuration to be active for a task.

8. The system architecture of claim 1, in which:
   a) each module makes itself available for a configuration task and provides the configuration task with its capabilities;
   b) a configuration task initiates a discovery phase to determine what devices and modules exist within the system and are qualified for configuration;
   c) permissions are granted by a device to a configuration task for that device and modules related to that device to be configurable;
   d) an authentication protocol is used to verify the validity of a device within the system.

9. The system architecture of claim 1, in which:
   a) detector type module output can be selected for use to reconfigure or switch configuration states of the system resulting in output from a plurality of modules for a modified task;
   b) at least one module from the plurality of modules contains a module specification file which uploads its data to a composer;
   c) permissions define the composer's access to a module; and
   d) an authentication protocol is used by the composer to verify the validity of a module.

10. The system architecture of claim 1, for machine vision, in which the plurality of devices includes at least one detector module that is a camera and at least one emitter module that is an illumination source.

11. The system architecture of claim 10, further comprising a signal input interface and a signal output interface.

12. The system architecture of claim 1, for motion control tasks, in which:
   a) a plurality of actuator modules are used to implement motion tasks at specific times and under specific conditions, and
   b) a plurality of detector modules are used to sense motion within a system at specified times.

13. The system architecture of claim 1, comprising audio, illumination, and video detector devices, for the management and execution of visual and audio effects for the visual and auditory arts including but not limited to: concerts, plays, television shows, and cinema.

14. The system architecture of claim 1, in which:
   a) a standardized format is used for configuring of the devices and modules and for implementing execution events by the devices and modules;
   b) a data packager identifies, assembles and distributes data detected from a series of events in a selected scenario;
   c) a standardized format is used for implementing data distribution rules for at least one module;
   d) a synchronized clock distributed to a plurality of devices and a plurality of modules related to the devices provides a link between Time of Day fields in a command time schedule with a correct Time of Day execution time for a plurality of actions;
   e) a general command time schedule developed by a composer is transmitted to and consumed concurrently by the devices and modules to result in a plurality of time-controlled and time-identified events among the devices and the modules;
   f) a plurality of time-controlled and time-identified events among the devices and the modules are sequenced to produce a series of scene events in accordance with a selected scenario;
   g) each of a series of scene events is sensed by at least one module and a corresponding series of scene data is output by the module;
   h) a set of data for a scene event is given an identifier based on the scene event;
   i) the identifier comprises a data header from among the following: a Time of Day time of the scene event, a device identifier for a device that detects the scene event, a module identifier for a module that detects the scene event, specifics of a module command, specifics of a scene, a module state, feedback from prior events, a state of other devices, a state of other modules;
   j) a data header is used to send a set of data on zero, one, or more processing stream paths that is configurable.

15. The system architecture of claim 14, in which:
a) the module timing control and execution engine includes a method for dispatching commands at specified times, a method for taking a standardized command and decoding it to a module's specific needs and a method for passing on a decoded command to the module;
b) a plurality of detector type modules provide feedback for command reconfiguration;
c) an external signal is detected by an input module and used to specify when a specific scenario across a plurality of devices and modules is executed;
d) a timing schedule for a scenario is distributed to a plurality of the devices and modules that are selected during configuration to be active for a task;
e) each module makes itself available for a configuration task and provides the configuration task with its capabilities;
f) a configuration task initiates a discovery phase to determine what devices and modules exist within the system and are qualified for configuration;
g) permissions are granted by a device to a configuration task for that device and modules related to that device to be configurable;
h) an authentication protocol is used to verify the validity of a device within the system.

16. The system architecture of claim 14, in which:
a) a multiplicity of the devices and modules are decentralized, and a synchronization method is used to provide each device and module with a common Time of Day;
b) detector type module output can be selected for use to reconfigure or switch configuration states of the system resulting in output from a plurality of modules for a modified task;
c) a module contains a module specification file which uploads its data to a composer;
d) permissions define the composer's access to a module;
e) an authentication protocol is used by the composer to verify the validity of a module.

17. The system architecture of claim 14, used for machine vision, in which the plurality of devices includes camera modules and illumination modules, and further comprising a signal input interface and a signal output interface.

18. The system architecture of claim 1, used for motion control tasks, in which a plurality of actuator modules are used to implement motion tasks at specific times and under specific conditions and a plurality of detector modules are used to sense motion within a system at specified times.

19. The system architecture of claim 14, comprising audio, illumination, and video detector devices, for the management and execution of visual and audio effects for the visual and auditory arts including but not limited to: concerts, plays, television shows, and cinema.

20. The system architecture of claim 14, in which:
a) the module timing control and execution engine includes a method for dispatching commands at specified times, a method for taking a standardized command and decoding it to a module's specific needs and a method for passing on a decoded command to the module;
b) a plurality of detector type modules provide feedback for command reconfiguration;
c) an external signal is detected by an input module and used to specify when a specific scenario across a plurality of devices and modules is executed;
d) a timing schedule for a scenario is distributed to a plurality of the devices and modules that are selected during configuration to be active for a task;
e) each module makes itself available for a configuration task and provides the configuration task with its capabilities;
f) a configuration task initiates a discovery phase to determine what devices and modules exist within the system and are qualified for configuration;
g) permissions are granted by a device to a configuration task for that device and modules related to that device to be configurable;
h) an authentication protocol is used to verify the validity of a device within the system;
i) a multiplicity of the devices and modules are decentralized, and a synchronization method is used to provide each device and module with a common Time of Day;
j) detector type module output can be selected for use to reconfigure or switch configuration states of the system resulting in output from a plurality of modules for a modified task;
k) a module contains a module specification file which uploads its data to a composer;
l) permissions define the composer's access to a module;
m) an authentication protocol is used by the composer to verify the validity of a module;
n) data headers are built from information contained in a Command Time Schedule provided at configuration, and appended to respective raw detector data from a detector type Module by the module's Data Packager, which appends the data headers at appropriate times according to the Time of Day fields in the Command Time Schedule and the current Time of Day provided by the synchronized clock;
o) a combined stream of data that included the raw detector data and the data header is forward to a data router, which uses logic provided at configuration in the form of a data router configuration file to select zero, one or more downstream paths to forward the data to, based on the information contained within the data header;
p) a device comprises a container, a synchronized clock, interfacing hardware and interfacing software for a plurality modules.

* * * * *